(No Model.)

E. SEYFARTH.
CREDIT SLIP TABLET.

No. 439,434. Patented Oct. 28, 1890.

Witnesses
Harry S. Rohrer
A. E. Thader

Inventor
Edward Seyfarth
By Wiles & Crane,
Attorneys

UNITED STATES PATENT OFFICE.

EDWARD SEYFARTH, OF LANARK, ILLINOIS.

CREDIT-SLIP TABLET.

SPECIFICATION forming part of Letters Patent No. 439,434, dated October 28, 1890.

Application filed April 2, 1890. Serial No. 346,329. (No model.)

*To all whom it may concern:*

Be it known that I, EDWARD SEYFARTH, a resident of Lanark, in the county of Carroll and State of Illinois, have invented certain new and useful Improvements in Credit-Slip Tablets; and I do hereby declare the following to be a full, clear, and exact description of the invention, such as will enable others skilled in the art to which it pertains to make and use the same.

The object of this invention is to enable merchants who deal with customers personally known to them to dispense with accounts without abandoning the credit system in business, to avoid mistakes and disputes as to items, and to keep the most exact knowledge and control of the business. These ends are attained by obtaining the signature of the customer to a promissory note printed at the bottom of each credit-slip. Ordinarily requesting settlement by note of each credit-purchase would be out of the question; but by the use of a novel credit-slip the ends above set forth have been for a considerable time fully attained with great satisfaction to both merchants and customers.

The invention is fully illustrated in the accompanying drawings, in which—

Figure 1 shows a tablet of credit-slips involving my invention. Fig. 2 shows the reverse side of the slip seen in Fig. 1. Fig. 3 shows a duplicate slip alternating in the tablet with the slips of Figs. 1 and 2. Fig. 4 shows the top of the slip of Figs. 1 and 2 detached and folded so as to bring its number alongside the other matter upon the slip.

In the drawings, A is a credit-slip having the usual business-card heading and blank space for items of sale. Below the blank space is printed a primissory-note form D, and above the heading is a stub E, made detachable from the body of the slip by a line of perforations, and having at one end a number pertaining to this slip only, the slips being numbered consecutively in each tablet. Upon the reverse side of the stub and upon the end or half opposite the number upon the face is printed a form for the name of the promisor, the amount for which the note is given, and the total amount paid. These slips are numbered consecutively and alternate in the tablet with the duplicate slips shown in Fig. 3, which register accurately with them, so that the matter entered upon the first slip may be transferred by a carbon-sheet to the corresponding blank spaces in the second. The articles bought being entered, with the prices, in the usual manner, and the note having been filled out for the sum of the items above, both slips are torn from the tablet, the first to be retained, the second or duplicate to be given to the customer. The one retained is then folded lengthwise in the middle and indorsed with the name and amount upon the stub. It is then in convenient form for filing away until it becomes due or is paid. As a matter of convenience, a register of the notes may be kept, and such register may be of any desired form, but is preferably such as to permit finding a given note by the number of the slip upon which it is written. Partial payments may be noted upon the back of the slip in the usual manner, and when the note is fully paid it is so stamped and delivered to the customer. The remaining blanks upon the stub are filled at this time, and it is torn off along the line of perforations, folded as shown in Fig. 4, and used like a cash-sale slip in making up or checking the cash received for the day. It is also used in marking the note paid upon the register, if one is kept. The end of the stub is gummed at F, so that when folded as stated it may be secured in place.

It is to be noticed that the customer signs at the time the bill is made out by the seller or his clerk, so that both parties are practically estopped from afterward questioning the correctness of the bill. I have found it convenient to use tablets of different tints for notes of thirty, sixty, and ninety days, giving the customer such time as he may request, the colors preventing mistakes by clerks; nor is it very material that long time is given, for these notes may be deposited in bank and advances be obtained upon them. In short, at the close of each day the entire proceeds of sales is cash or its equivalent if the usual caution in giving credit has been exercised.

What I claim is—

1. The combination, with a credit-sales-slip form, of a promissory-note form printed upon the same sheet and a stub adapted to be torn from the slip and having printed upon it a form for a summary or memorandum of the note, substantially as set forth.

2. The combination, with the credit-sales-slip form and the promissory-note form printed below it upon the same sheet, of the detachable stub having upon its face the identifying number and upon its reverse side the gummed surface and the form for the summary or memorandum of the note.

3. The combination, in a credit-sales-slip tablet, of the sales-slip form having the promissory-note form printed upon the same sheet and the detachable stub bearing the summary form and the alternate duplicate slips having their blanks registering with the blanks in the first, substantially as and for the purpose set forth.

In testimony whereof I have signed this specification in the presence of two subscribing witnesses.

EDWARD SEYFARTH.

Witnesses:
 WALLACE GREENE,
 HARRY S. ROHRER.